US012479444B2

(12) United States Patent
Koji et al.

(10) Patent No.: US 12,479,444 B2
(45) Date of Patent: Nov. 25, 2025

(54) DETECTION FUNCTION CONTROL DEVICE, DETECTION FUNCTION CONTROL METHOD, AND NON-TRANSITORY COMPUTER READABLE MEDIUM

(71) Applicant: JVCKENWOOD Corporation, Yokohama (JP)

(72) Inventors: Yoshiharu Koji, Yokohama (JP); Takashi Onodera, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 225 days.

(21) Appl. No.: 18/366,279

(22) Filed: Aug. 7, 2023

(65) Prior Publication Data

US 2023/0382397 A1  Nov. 30, 2023

Related U.S. Application Data

(63) Continuation of application No. PCT/JP2022/001149, filed on Jan. 14, 2022.

(30) Foreign Application Priority Data

Mar. 4, 2021 (JP) ................................ 2021-034404

(51) Int. Cl.
  *B60W 40/08* (2012.01)
  *G06V 20/59* (2022.01)

(52) U.S. Cl.
  CPC ........... *B60W 40/08* (2013.01); *G06V 20/597* (2022.01); *B60W 2420/403* (2013.01); *B60W 2540/21* (2020.02); *B60W 2540/223* (2020.02); *B60W 2540/229* (2020.02)

(58) Field of Classification Search
  None
  See application file for complete search history.

(56) References Cited

U.S. PATENT DOCUMENTS

2017/0136969 A1*  5/2017  Drescher ................. G06F 3/005
2023/0174074 A1*  6/2023  Choi ..................... B60W 40/09

FOREIGN PATENT DOCUMENTS

| JP | 2003-226227 A | 8/2003 |
| JP | 2010-250577 A | 11/2010 |
| JP | 2014-016702 A | 1/2014 |
| JP | 2014-032119 A | 2/2014 |
| JP | 2014-232421 A | 12/2014 |
| JP | 3207515 U | 11/2016 |
| JP | 2020-183226 A | 11/2020 |

* cited by examiner

*Primary Examiner* — Christian Chace
*Assistant Examiner* — Shayne M. Gilbertson
(74) *Attorney, Agent, or Firm* — PROCOPIO, CORY, HARGREAVES & SAVITCH LLP

(57) ABSTRACT

A detection function control device includes: a vehicle situation determining unit configured to determine a situation of a vehicle on the basis of detection results of one or more of an ignition state, whether a driver is seated in a seat, the acceleration of the vehicle, the position of the vehicle, the speed of the vehicle, and sound which is collected; and a detection function control unit configured to determine which of one or more detection functions for detecting dangerous driving is to be activated on the basis of the situation determined by the vehicle situation determining unit.

6 Claims, 5 Drawing Sheets

FIG. 3

| | DETECTION OF VEHICLE STOP (ACCELERATION SENSOR, GPS DATA, VEHICLE SPEED PULSE DATA, etc.) | DETECTION OF VEHICLE MOVEMENT (ACCELERATION SENSOR, GPS DATA, VEHICLE SPEED PULSE DATA, etc.) | DETECTION OF VEHICLE TURN (GYRO SENSOR, STEERING ANGLE DATA, etc.) | DETECTION OF DRIVER SILENCE (SOUND DATA) | DETECTION OF DRIVER SPEAKING (SOUND DATA) |
|---|---|---|---|---|---|
| FACE AUTHENTICATION | EXECUTION | STOP | STOP | STOP | STOP |
| INATTENTIVE DRIVING | STOP | EXECUTION | STOP | — | — |
| DROWSY DRIVING | STOP | EXECUTION (DETECTION ALONG WITH SILENCE) | EXECUTION (DETECTION ALONG WITH SILENCE) | EXECUTION (DETECTION ALONG WITH MOVEMENT) | STOP |
| CALLING MOTION | STOP | EXECUTION (DETECTION ALONG WITH SPEECH) | EXECUTION (DETECTION ALONG WITH SILENCE) | STOP | EXECUTION (DETECTION ALONG WITH MOVEMENT) |

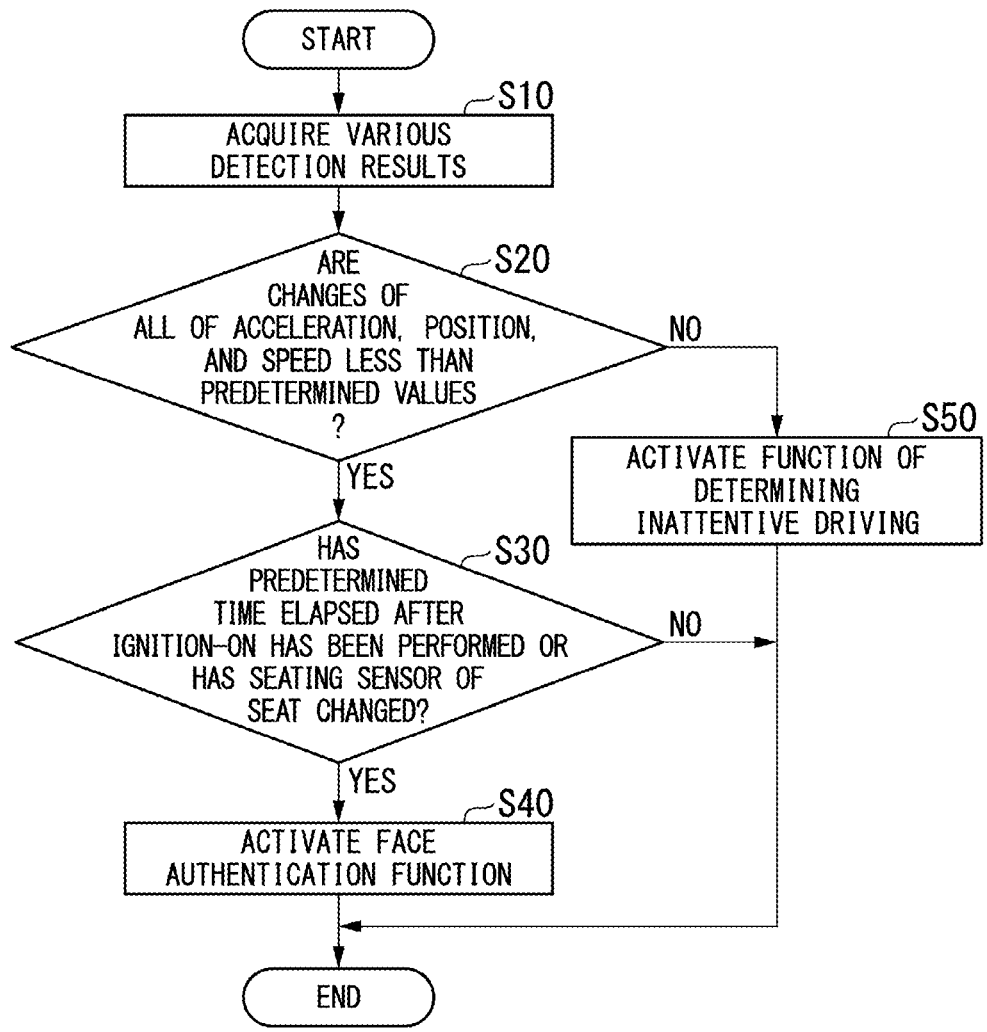

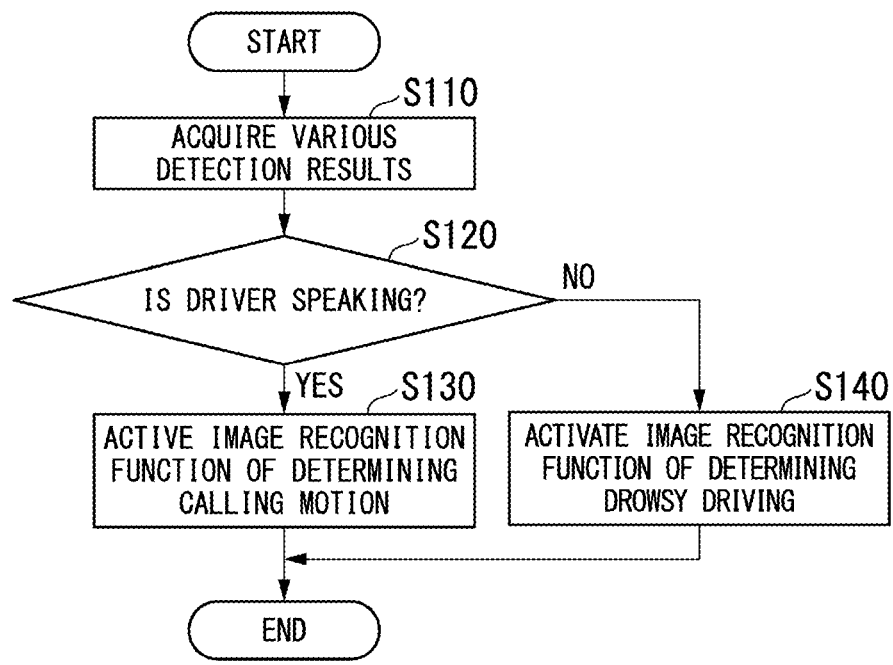

DETECTION FUNCTION CONTROL DEVICE, DETECTION FUNCTION CONTROL METHOD, AND NON-TRANSITORY COMPUTER READABLE MEDIUM

CROSS REFERENCE TO RELATED APPLICATION

The present application is a continuation application of International Application No. PCT/JP2022/001149, filed on Jan. 14, 2022, which claims priority to Japanese Patent Application No. 2021-034404, filed on Mar. 4, 2021. The contents of these applications are incorporated herein by reference.

BACKGROUND

The present invention relates to a detection function control device, a detection function control method, and a non-transitory computer readable medium.

Technology of mounting an artificial intelligence (AI) function in a small-sized terminal and performing face authentication, drowsiness detection, or the like of a user is known. For example, a device that detects drowsiness without using a camera is known (Patent Document 1 (Japanese Unexamined Patent Application, First Publication No. 2010-250577)).

SUMMARY

An AI function needs to execute different inference models according to the purpose thereof. A large amount of computation resources (CPU resources or dedicated circuit resources) are required for execution of an inference model. Accordingly, the number of inference models which can be simultaneously executed using a small-sized terminal is limited.

Recently, a high-performance drive recorder in which a driver monitoring system (DMS) is mounted is known. In the DMS, for example, a driver face authentication function and a function of detecting inattentive driving, drowsy driving, the action of making a telephone call, or the like of a driver and giving a warning against dangerous driving are mounted. However, a small-sized terminal may not have the computation capability for performing all the functions. Accordingly, it is difficult to mount a function such as the DMS in a small-sized terminal.

There is necessity for activation of more detection functions with respect to mounted computation capability.

A first aspect of the present embodiment provides a detection function control device according to an aspect of the embodiment includes: a vehicle situation determining unit configured to determine the situation of a vehicle on the basis of detection results of one or more of an ignition state, whether a driver is seated in a seat, the acceleration of the vehicle, the position of the vehicle, the speed of the vehicle, and sound which is collected; and a detection function control unit configured to determine which of one or more detection functions for detecting dangerous driving is to be activated on the basis of the situation determined by the vehicle situation determining unit.

A second aspect of the present embodiment provides a detection function control method according to another aspect of the embodiment includes: a vehicle situation determining step of determining a situation of a vehicle on the basis of detection results of one or more of an ignition state, whether a driver is seated in a seat, the acceleration of the vehicle, the position of the vehicle, the speed of the vehicle, and sound which is collected; and a detection function control step of determining which of one or more detection functions for detecting dangerous driving is to be activated on the basis of the situation determined in the vehicle situation determining step.

A third aspect of the present embodiment provides a non-transitory computer readable medium storing a program causing a computer to execute: a vehicle situation determining step of determining a situation of a vehicle on the basis of detection results of one or more of an ignition state, whether a driver is seated in a seat, the acceleration of the vehicle, the position of the vehicle, the speed of the vehicle, and sound which is collected; and a detection function control step of determining which of one or more detection functions for detecting dangerous driving is to be activated on the basis of the situation determined in the vehicle situation determining step.

BRIEF DESCRIPTION OF THE DRAWINGS

FIG. 3 is a diagram illustrating an example of a relationship between a vehicle situation and whether to activate a plurality of detection functions according to the embodiment.

FIG. 4 is a diagram illustrating an example of a detection function control process according to the embodiment.

FIG. 5 is a diagram illustrating another example of the detection function control process according to the embodiment.

DETAILED DESCRIPTION

Embodiment

Hereinafter, an embodiment of the present invention will be described in detail with reference to the accompanying drawings. In this embodiment, for example, it is assumed that an AI for performing driver face authentication and detecting a plurality of detection items such as inattentive driving, drowsy driving, and calling motion is mounted in a drive recorder 1. The drive recorder 1 is mounted in a vehicle 3 (not illustrated) that is driven by a driver 2 (not illustrated). The drive recorder 1 is mainly installed, for example, in an instrument panel or a front windshield of the vehicle 3 (not illustrated).

[Configuration of Drive Recorder]

Figure 1:
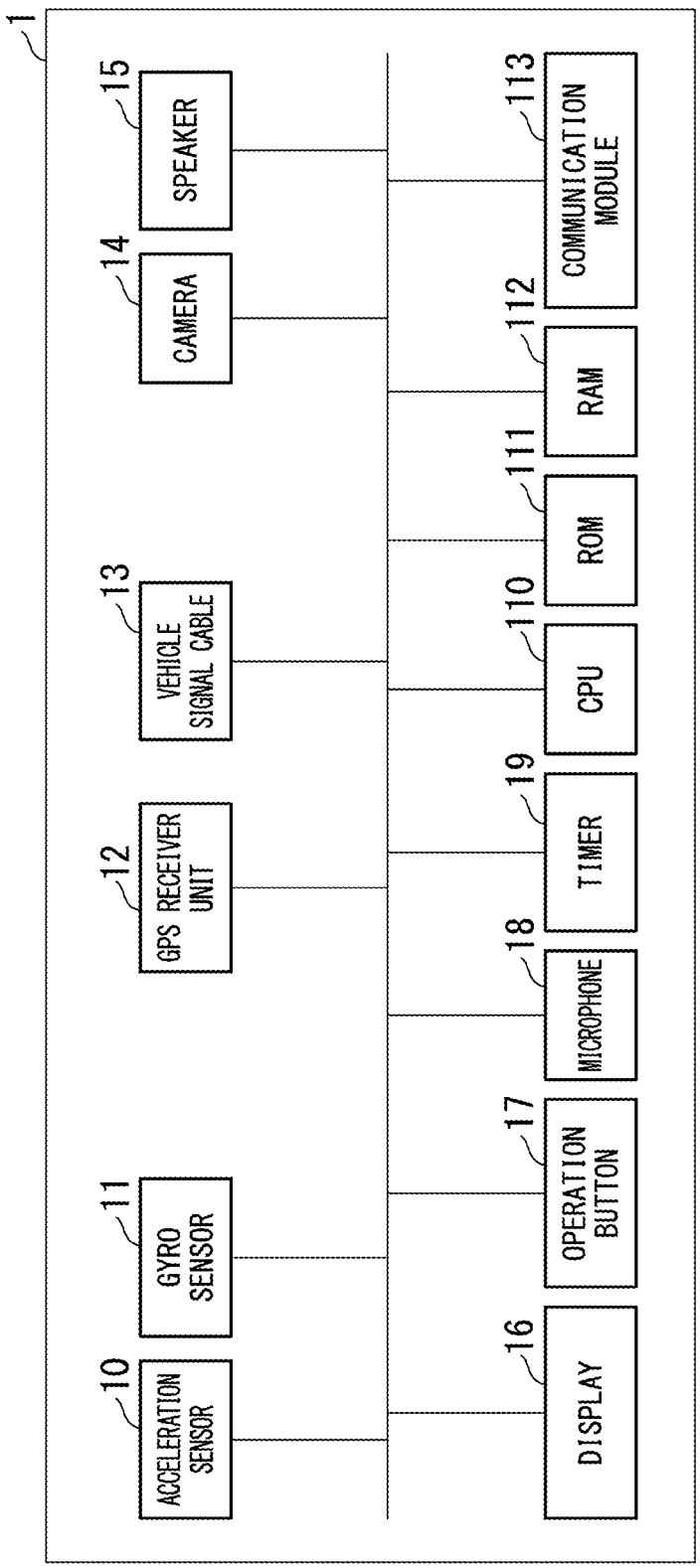
FIG. 1 is a diagram illustrating an example of a hardware configuration of a drive recorder according to an embodiment.

FIG. 1 is a diagram illustrating an example of a hardware configuration of the drive recorder 1 according to the embodiment. The drive recorder 1 includes an acceleration sensor 10, a gyro sensor 11, a GPS receiver unit 12, a vehicle signal cable 13, a camera 14, a speaker 15, a display 16, an operation button 17, a microphone 18, a timer 19, a CPU 110, a ROM 111, a RAM 112, and a communication module 113. The acceleration sensor 10, the gyro sensor 11, the GPS receiver unit 12, the vehicle signal cable 13, the camera 14, the speaker 15, the display 16, the operation button 17, the microphone 18, the timer 19, the CPU 110, the ROM 111, the RAM 112, and the communication module 113 are connected to each other via signal lines.

The acceleration sensor 10 measures acceleration of the vehicle 3.

The gyro sensor 11 measures an angular velocity of the vehicle 3.

The GPS receiver unit 12 acquires information indicating a current location of the vehicle 3 using a global positioning system (GPS).

The vehicle signal cable 13 acquires a vehicle signal from the vehicle 3. The vehicle signal is a signal indicating a state of the vehicle 3. The vehicle signal cable 13 acquires various vehicle signals from an electronic control unit (ECU) of the vehicle 3. The various vehicle signals include, for example, an ignition switch signal, a vehicle speed signal, a signal indicating a steering angle of the vehicle 3, and a signal indicating the value of a pressure applied to a seat of the vehicle 3.

The camera 14 includes a first camera and a second camera. The first camera images a partial or whole body of a driver 2. The second camera captures and records a moving image of the vehicle 3 while it is traveling.

The speaker 15 outputs warning sound by speech.

The display 16 displays various screens. The display 16 is, for example, a liquid crystal display or an organic electroluminescence (EL) display.

The operation button 17 is a button for allowing a user to operate the drive recorder 1.

The display 16 may be a touch panel. In this case, the operation button 17 may be incorporated into the display 16. Alternatively, a part of the operation button 17 may be incorporated into the display 16.

The microphone 18 collects sound. The sound includes speech uttered by the driver 2.

The timer 19 keeps time.

The CPU 110 reads a program from the ROM 111 and performs various types of control in accordance with the read program. The CPU 110 has a plurality of internal storage media such as registers built thereinto. The CPU 110 temporarily stores data in the internal storage media from the ROM 111 and performs an arithmetic process on the data. The CPU 110 outputs the arithmetic result to the registers and outputs the arithmetic result from the registers to the RAM 112 or an external storage medium.

The ROM 111 is a main storage device that stores various programs, data, and parameters used for the CPU 110 to perform various arithmetic operations or control. The ROM 111 can hold stored details even in a state in which electric power supplied to the ROM 111 is zero.

The RAM 112 is a main storage device that is used as a working memory of the CPU 110. Writing and deleting of programs or data are performed on the RAM 112 by the CPU 110. The RAM 112 is constituted by, for example, a storage device such as a semiconductor storage device.

The communication module 113 performs transmission and reception of various types of information via a wireless network NW. The communication module 113 includes a communication interface (I/F).

Figure 2:
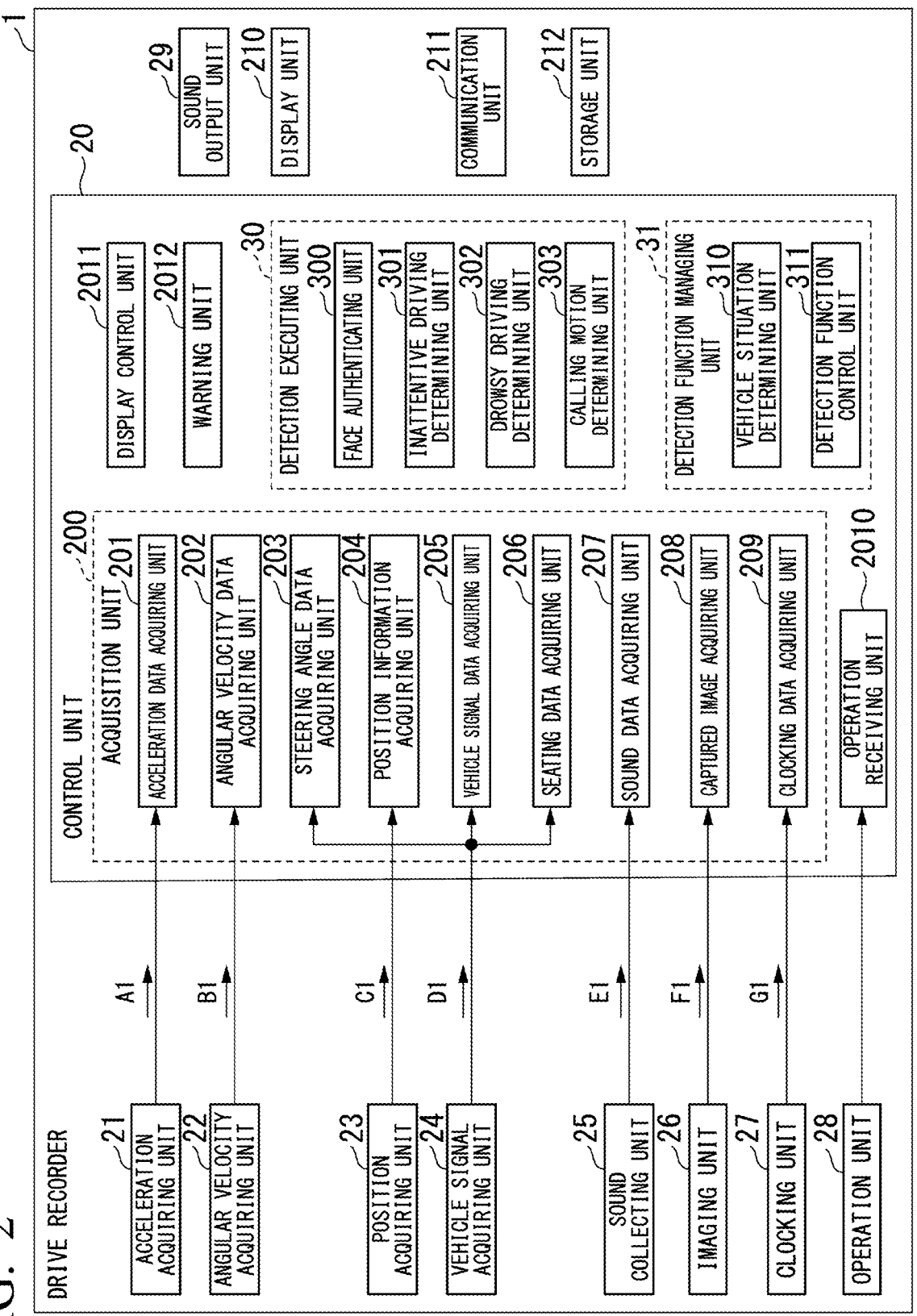
FIG. 2 is a diagram illustrating an example of a functional configuration of the drive recorder according to the embodiment.

FIG. 2 is a diagram illustrating an example of a function configuration of the drive recorder 1 according to the embodiment. The drive recorder 1 includes a control unit 20, an acceleration acquiring unit 21, an angular velocity acquiring unit 22, a position acquiring unit 23, a vehicle signal acquiring unit 24, a sound collecting unit 25, an imaging unit 26, a clocking unit 27, an operation unit 28, a sound output unit 29, a display unit 210, a communication unit 211, and a storage unit 212.

The control unit 20 performs various types of control for the drive recorder 1. The control unit 20 includes, for example, a CPU and performs various types of calculation or transmission and reception of information. The functional units of the control unit 20 are realized by causing the CPU to read and execute a program from the ROM. The functional units of the control unit 20 will be described later. The control unit 20 includes the CPU 110, the ROM 111, and the RAM 112 illustrated in FIG. 1.

The acceleration acquiring unit 21 acquires an acceleration of the vehicle 3. The acceleration acquiring unit 21 generates acceleration data A1 on the basis of the acquired acceleration. The acceleration data A1 indicates the acceleration of the vehicle 3. The acceleration acquiring unit 21 includes the acceleration sensor 10 illustrated in FIG. 1.

The angular velocity acquiring unit 22 acquires an angular velocity of the vehicle 3. The angular velocity acquiring unit 22 generates angular velocity data B1 on the basis of the acquired angular velocity. The angular velocity data B1 indicates the angular velocity of the vehicle 3. The angular velocity acquiring unit 22 includes the gyro sensor 11 illustrated in FIG. 1.

The position acquiring unit 23 acquires a position of the vehicle 3. The position acquiring unit 23 generates position data C1 on the basis of the acquired position. The position data C1 indicates the position of the vehicle 3. The position acquiring unit 23 includes the GPS receiver unit 12 illustrated in FIG. 1.

The vehicle signal acquiring unit 24 acquires a vehicle signal of the vehicle 3. The vehicle signal acquiring unit 24 generates vehicle signal data D1 on the basis of the acquired vehicle signal. The vehicle signal data D1 includes data indicating on or off of ignition, data indicating a vehicle speed of the vehicle 3, steering angle data, and seating data. The steering angle data indicates a steering angle of the vehicle 3. The seating data indicates a value of a pressure applied to a seat of the vehicle 3. The vehicle signal acquiring unit 24 includes the vehicle signal cable 13 illustrated in FIG. 1.

The sound collecting unit 25 collects sound based on speech uttered by the driver 2. The sound collecting unit 25 generates sound data E1 as a result of collection. The sound data E1 indicates sound based on speech uttered by the driver 2. The sound collecting unit 25 includes the microphone 18 illustrated in FIG. 1.

The imaging unit 26 images one or more of a face of the driver 2 and a motion of the driver 2. The imaging unit 26 generates image data F1 as a result of imaging. The image data F1 indicates one or more of the face of the driver 2 and the motion of the driver 2. The imaging unit 26 includes the camera 14 illustrated in FIG. 1.

The clocking unit 27 performs various types of clocking. The clocking unit 27 performs start and stop of clocking in response to a signal from the control unit 20. The clocking unit 27 generates clocking data G1 as a result of clocking. The clocking data G1 includes, for example, a time period having elapsed after a clocking start signal has been acquired from the control unit 20 and until a clocking stop signal has been acquired. The clocking unit 27 may perform a plurality of types of clocking in parallel. When a plurality of types of clocking are performed in parallel, the clocking data G1 includes results of the plurality of types of clocking. The clocking data G1 may include a current time.

The clocking unit 27 includes the timer 19 illustrated in FIG. 1.

The operation unit 28 receives various operations from a user of the drive recorder 1. The operation unit 28 includes the operation button 17 illustrated in FIG. 1. When the operation button 17 and the display 16 are unified as a touch panel, the operation unit 28 includes the touch panel.

The sound output unit 29 outputs various types of sound. The sound output from the sound output unit 29 includes, for example, sound which is output as warning sound when an abnormality has been detected as a result of detection of the driver 2.

The display unit 210 displays various screens. The screens displayed by the display unit 210 include, for example, a warning screen which is displayed as a warning when an abnormality has been detected as a result of detection of the driver 2. The display unit 210 includes the display 16 and the RAM 112 illustrated in FIG. 1. Image data of the warning screen is stored in the RAM 112.

The communication unit 211 communicates with an external device. The external device with which the communication unit 211 communicates includes a server (not illustrated). The communication unit 211 includes the communication module 113 illustrated in FIG. 1.

The storage unit 212 stores various types of information. The storage unit 212 includes the RAM 112 illustrated in FIG. 1.

The functional units of the control unit 20 will be described below. The control unit 20 includes an acquisition unit 200, an operation receiving unit 2010, a display control unit 2011, a warning unit 2012, a detection executing unit 30, and a detection function managing unit 31.

The acquisition unit 200 acquires various types of information. The acquisition unit 200 includes an acceleration data acquiring unit 201, an angular velocity data acquiring unit 202, a steering angle data acquiring unit 203, a position information acquiring unit 204, a vehicle signal data acquiring unit 205, a seating data acquiring unit 206, a sound data acquiring unit 207, a captured image acquiring unit 208, and a clocking data acquiring unit 209.

The acceleration data acquiring unit 201 acquires the acceleration data A1 from the acceleration acquiring unit 21.

The angular velocity data acquiring unit 202 acquires the angular velocity data B1 from the angular velocity acquiring unit 22.

The steering angle data acquiring unit 203 acquires the steering angle data included in the vehicle signal data D1 from the vehicle signal acquiring unit 24.

The position information acquiring unit 204 acquires the position data C1 from the position acquiring unit 23.

The vehicle signal data acquiring unit 205 acquires the vehicle signal data D1 from the vehicle signal acquiring unit 24.

The seating data acquiring unit 206 acquires seating pressure data included in the vehicle signal data D1 from the vehicle signal acquiring unit 24.

The sound data acquiring unit 207 acquires the sound data E1 from the sound collecting unit 25.

The captured image acquiring unit 208 acquires the image data F1 from the imaging unit 26.

The clocking data acquiring unit 209 acquires the clocking data G1 from the clocking unit 27.

The operation receiving unit 2010 receives various operations performed on the operation unit 28.

The display control unit 2011 controls the display unit 210 such that various screens are displayed on the display unit 210.

The warning unit 2012 executes a warning. For example, the warning unit 2012 controls the sound output unit 29 such that warning sound is output from the sound output unit 29.

The detection executing unit 30 has an AI function and detects a plurality of detection items such as a calling motion. In other words, the detection executing unit 30 performs a plurality of detection functions according to the plurality of detection items. Trained models used for the detection executing unit 30 to perform various determinations are stored in the storage unit 212. The detection executing unit 30 corresponds to a driver monitoring system (DMS).

The detection executing unit 30 includes a face authenticating unit 300, an inattentive driving determining unit 301, a drowsy driving determining unit 302, and a calling motion determining unit 303.

The face authenticating unit 300 authenticates a face of the driver 2. The face authenticating unit 300 performs authentication on the basis of the AI function by comparing the face of the driver 2 indicated by the image data F1 acquired by the captured image acquiring unit 208 with a face image (not illustrated) of an owner of the vehicle 3 stored in the storage unit 212. The face authenticating unit 300 collects a result of the face authentication as driver information. The face authentication is for preventing an unauthorized or irrelevant person from driving the vehicle, for example, when the vehicle 3 is a business-use vehicle or the like. For example, the face authenticating unit 300 causes the warning unit 2012 to execute the warning when it is determined as the result of face authentication that the driver 2 is an unauthorized person. Alternatively, the face authentication may be used to verify whether the driver 2 is an owner of the vehicle 3 for the purpose of theft prevention.

The inattentive driving determining unit 301 determines inattentive driving. The inattentive driving determining unit 301 determines whether the driver 2 is performing inattentive driving on the basis of a motion of the driver 2 (for example, a face direction or a sight direction) indicated by the image data F1 acquired by the captured image acquiring unit 208. When it is determined that the driver 2 is performing inattentive driving, the inattentive driving determining unit 301 causes the warning unit 2012 to execute warning.

The drowsy driving determining unit 302 determines drowsy driving. The drowsy driving determining unit 302 determines whether the driver is drowsy on the basis of a motion of the driver 2 (for example, shaking of the head or whether an eyelid is open) indicated the image data F1 acquired by the captured image acquiring unit 208. When it is determined that the driver 2 is drowsy, the drowsy driving determining unit 302 causes the warning unit 2012 to execute warning.

The calling motion determining unit 303 determines a calling motion. The calling motion determining unit 303 determines a calling motion on the basis of speech of the driver 2 indicated by the sound data E1 acquired by the sound data acquiring unit 207. The calling motion determining unit 303 may determine a calling motion on the basis of a motion of the driver 2 (for example, a motion of putting a mobile phone close to the ear) indicated by the image data F1 acquired by the captured image acquiring unit 208. When it is determined that the driver 2 is calling, the calling motion determining unit 303 causes the warning unit 2012 to execute warning.

The detection function managing unit 31 determines which of the plurality of detection functions which are performed by the detection executing unit 30 is to be activated. In other words, the detection function managing unit 31 selects a detection function to be activated out of the plurality of detection functions. The detection function managing unit 31 may activate one detection function or activate a plurality of detection functions as a result of detection (or selection).

In the following description, a process which is performed by the detection function managing unit 31 is also referred to as a detection function control process.

The detection function managing unit 31 includes a vehicle situation determining unit 310 and a detection function control unit 311.

The vehicle situation determining unit 310 determines a vehicle situation on the basis of a result of detection of a predetermined detection item. Here, the predetermined detection item is, for example, one or more of an ignition state, whether a driver is seated in a seat, the acceleration of the vehicle, the position of the vehicle 3, the speed of the vehicle 3, and collected sound. The vehicle situation is the situation of the vehicle 3. The vehicle situation includes, for example, a movement situation of the vehicle 3, a situation in which driving is started or a driver is exchanged, and a situation in which the driver 2 is speaking. The movement situation of the vehicle 3 includes, for example, a situation in which the vehicle 3 is moving and a situation in which the vehicle 3 travels ahead straightly.

The predetermined detection item may be, for example, one or more of an ignition state, whether a driver is seated in a seat, the acceleration of the vehicle, the position of the vehicle 3, the speed of the vehicle 3, and collected sound.

The detection function control unit 311 determines which of one or more detection functions for detecting dangerous driving is to be activated on the basis of the vehicle situation determined by the vehicle situation determining unit 310. The detection function control unit 311 outputs a result of determination to the detection executing unit 30 and causes the detection executing unit 30 to activate the detection function indicated by the result of determination out of a plurality of detection functions.

A relationship between the vehicle situation and whether to activate a plurality of detection functions will be described below with reference to FIG. 3. FIG. 3 is a diagram illustrating an example of a relationship between the vehicle situation and whether to activate a plurality of detection functions according to the embodiment.

In FIG. 3, a situation in which the vehicle 3 stops, a situation in which the vehicle 3 is moving, a situation in which the vehicle 3 is turning, a situation in which the driver 2 is silent, and a situation in which the driver 2 is speaking are illustrated as the vehicle situation. In FIG. 3, in each vehicle situation, whether to activate a detection mechanism is shown for each detection item such as face authentication, inattentive driving, drowsy driving, and calling motion.

Collection of driver information through face authentication is required at the time of start of driving and at the time of exchange of a driver. The face authentication is executed only when the situation in which the vehicle 3 is not moving (stops) is detected on the basis of the acceleration sensor, the GPS data, the vehicle speed pulse data, and the like, and the face authentication is stopped in the other time at which the situation is not detected.

Dangerous driving warning based on detection of inattentive driving is required when the vehicle 3 travels ahead straightly. The inattentive driving detection function is executed only when the situation in which the vehicle 3 is moving is detected on the basis of the acceleration sensor, the GPS data, the vehicle speed pulse data, and the like and the situation in which the vehicle 3 is not turning (travels straightly) is detected on the basis of the gyro sensor and the steering angle data, and the inattentive driving detection function is stopped in the other time in which the situations are not detected. Detection of silence of a driver or detection of speech of a driver is not required for determination of whether the inattentive driving detection function is to be executed.

Dangerous driving warning based on detection of drowsy driving is required when the vehicle 3 is moving and the driver 2 is silent. The drowsy driving detection function is executed only when the situation in which the vehicle 3 is moving is detected on the basis of the acceleration sensor, the GPS data, the vehicle speed pulse data, and the like, the situation in which the vehicle 3 is turning is detected on the basis of the gyro sensor, the steering angle data, and the like, or the situation in which the driver is silent is detected on the basis of the sound data collected by the microphone, and the drowsy driving detection function is stopped in the other time in which the situations are not detected.

Dangerous driving warning based on detection of a calling motion is required when the vehicle 3 is moving and the driver 2 is speaking. The calling motion detection function is executed only when the situation in which the vehicle 3 is moving is detected on the basis of the acceleration sensor, the GPS data, the vehicle speed pulse data, and the like, the situation in which the vehicle 3 is turning is detected on the basis of the gyro sensor, the steering angle data, and the like, or the situation in which the driver is speaking is detected on the basis of the sound data collected by the microphone, and the drowsy driving detection function is stopped in the other time in which the situations are not detected.

[Detection Function Control Process]

A specific example of the detection function control process will be described below with reference to FIGS. 4 and 5. The control unit 20 repeatedly performs the detection function control processes illustrated in FIGS. 4 and 5 in parallel, for example, while the drive recorder 1 is powered on. Only one of the detection function control processes illustrated in FIGS. 4 and 5 may be performed.

Before the detection function control process illustrated in FIGS. 4 and 5 is started, it is determined that a plurality of detection functions are not activated. That is, a detection function which is determined not to be activated in the detection function control process illustrated in FIGS. 4 and 5 out of a plurality of detection functions is not activated by the control unit 20. Here, since the detection function control process illustrated in FIGS. 4 and 5 is repeatedly performed, a detection function which is determined not to be activated at a certain time may be determined to be activated in the next detection function control process. Similarly, a detection function which is determined to be activated at a certain time may be determined not to be activated in the next detection function control process.

FIG. 4 is a diagram illustrating an example of the detection function control process according to the embodiment.

Step S10: The vehicle situation determining unit 310 acquires various results of detection. Here, the vehicle situation determining unit 310 acquires the acceleration data A1 from the acceleration data acquiring unit 201. The vehicle situation determining unit 310 acquires the position data C1 from the position information acquiring unit 204. The vehicle situation determining unit 310 acquires the vehicle signal data D1 from the vehicle signal data acquiring unit 205. The vehicle situation determining unit 310 acquires the clocking data G1 from the clocking data acquiring unit 209. The vehicle situation determining unit 310 acquires seating pressure data from the seating data acquiring unit 206.

Step S20: The vehicle situation determining unit 310 determines whether changes of all of the acceleration of the vehicle 3, the position of the vehicle 3, and the speed of the vehicle 3 are less than predetermined values. The vehicle situation determining unit 310 calculates the change in acceleration, for example, by dividing the acceleration indicated by the acceleration data A1 by a predetermined time indicated by the clocking data G1. The vehicle situation determining unit 310 calculates the change in position, for example, by dividing a distance between a plurality of positions indicated by the position data C1 by the predetermined time indicated by the clocking data G1. The vehicle situation determining unit 310 calculates the change in vehicle speed, for example, on the basis of the vehicle speed signal indicated by the vehicle signal data D1 and the predetermined time indicated by the clocking data G1.

A predetermined change in acceleration of the vehicle 3 is, for example, a change exceeding continuous vibration due to an engine or the like. The predetermined change in acceleration may be determined in advance or may be frequently acquired from a representative value such as an average or a median of the change in acceleration in the past predetermined time.

The predetermined change in position of the vehicle 3 is, for example, a change in which the position in GPS after the unit time of 1 second has elapsed changes by a predetermined distance of 1 meter. The unit time is not limited to 1 second and may be set to an appropriate time equal to or greater than 10 msec and equal to or less than 10 seconds. The predetermined distance is not limited to 1 meter and may be set to an appropriate distance equal to or greater than 0 meter and equal to or less than 10 meters.

The predetermined change in speed of the vehicle 3 is, for example, 3 km/h. The speed is not limited to 3 km/h and may be set to an appropriate speed equal to or greater than 0 km/h and equal to or less than 5 km/h.

The vehicle situation determining unit 310 performs the process of Step S30 when it is determined that the changes of all of the acceleration of the vehicle 3, the position of the vehicle 3, and the speed of the vehicle 3 are less than predetermined values (Step S20: YES). On the other hand, when the vehicle situation determining unit 310 determines that the changes of one or more of the acceleration of the vehicle 3, the position of the vehicle 3, and the speed of the vehicle 3 are equal to or greater than the predetermined values (Step S20: NO), the detection function managing unit 31 performs the process of Step S50.

Step S30: The vehicle situation determining unit 310 determines whether a predetermined time has not elapsed after ignition-on has been performed or whether the seating sensor for a seat has changed. When the seating sensor for a seat has changed, it means that a position of an occupant sitting on the seat or the number of occupants has changed.

In order to determine whether a predetermined time has not elapsed after ignition-on has been performed, the vehicle situation determining unit 310 causes the clocking unit 27 to start clocking when the vehicle signal data D1 indicates that ignition-on has been performed. The vehicle situation determining unit 310 performs the determination by comparing a time elapsing after ignition-on has been performed with a predetermined time on the basis of the clocking data G1.

In order to determine whether a predetermined time has not elapsed after ignition-on has been performed, the determination may be performed on the basis of a vehicle signal other than the vehicle signal data D1.

In order to determine whether the seating sensor for a seat has changed, the vehicle situation determining unit 310 performs the determination on the basis of a value of a pressure applied to the seat of the vehicle 3 indicated by the seating pressure data.

When the vehicle situation determining unit 310 determines that a predetermined time has not elapsed after ignition-on has been performed or that the seating sensor for a seat has changed (Step S30: YES), the detection function managing unit 31 performs the process of Step S40. On the other hand, when the vehicle situation determining unit 310 determines that a predetermined time has elapsed after ignition-on has been performed and that the seating sensor for a seat has not changed (Step S30: NO), the detection function managing unit 31 ends the detection function control process.

Step S40: The detection function control unit 311 determines that the face authentication function is to be activated. The detection function control unit 311 causes the face authenticating unit 300 to perform the face authentication function.

Step S50: The detection function control unit 311 determines that the function of determining inattentive driving is to be activated. The detection function control unit 311 causes the inattentive driving determining unit 301 to perform the function of determining inattentive driving. That is, when the vehicle situation determining unit 310 determines that the changes of one or more of the acceleration of the vehicle 3, the position of the vehicle 3, and the speed of the vehicle 3 are equal to or greater than the predetermined values, the detection function control unit 311 activates the function of determining inattentive driving.

Then, the detection function managing unit 31 ends the detection function control process.

Face authentication is required when the driver 2 is exchanged. The detection function control process illustrated in FIG. 4 is based on the assumption that the driver 2 is exchanged when the vehicle 3 is not moving. In the detection function control process illustrated in FIG. 4, as an example of the condition that the vehicle 3 is not moving, the condition that a predetermined time has not elapsed after ignition-on has been performed is used.

Determination of inattentive driving is required when the vehicle 3 is traveling. In the detection function control process illustrated in FIG. 4, as an example of the condition that the vehicle 3 is traveling, a condition that the changes of the acceleration of the vehicle 3, the position of the vehicle 3, and the speed of the vehicle 3 are equal to or greater than the predetermined values is used.

As described above, in the detection function control process illustrated in FIG. 4, an example in which both of whether to activate the face authentication function and whether to activate the function of determining inattentive driving are determined has been described, but the present invention is not limited thereto. In the detection function control process illustrated in FIG. 4, determination of one of whether to activate the face authentication function and whether to activate the function of determining inattentive driving may be omitted.

When determination of whether to activate the face authentication function is omitted, the processes of Steps S30 and S40 are omitted in the detection function control process illustrated in FIG. 4. In this case, when the vehicle situation determining unit 310 determines that the changes of all of the acceleration of the vehicle 3, the position of the vehicle 3, and the speed of the vehicle 3 are less than the predetermined values in Step S20 (Step S20: YES), the detection function managing unit 31 ends the detection function control process. On the other hand, when the vehicle situation determining unit 310 determines that the changes of one or more the acceleration of the vehicle 3, the position of the vehicle 3, and the speed of the vehicle 3 are equal to or greater than the predetermined values in Step S20 (Step S20: NO), the detection function managing unit 31 performs the process of Step S50.

When the determination of whether to activate the function of determining inattentive driving is omitted, the processes of Steps S20 and S50 are omitted in the detection function control process illustrated in FIG. 4. In this case, the process of Step S30 is performed after the process of Step S10 has been performed. When the vehicle situation determining unit 310 determines that the predetermined time has not elapsed after ignition-on has been performed or that the seating sensor for a seat has changed in Step S30 (Step S30: YES), the detection function managing unit 31 performs the process of Step S40. On the other hand, when the vehicle situation determining unit 310 determines that the predetermined time has elapsed after ignition-on has been performed or that the seating sensor for a seat has not changed in Step S30 (Step S30: NO), the detection function managing unit 31 ends the detection function control process.

The situation in which the seating sensor for a seat has changed is an example of a situation in which a seating state has changed. Another example of the situation in which the seating state has changed is that a door of the vehicle 3 is opened and closed. In order to determine whether the seating state has changed, the vehicle situation determining unit 310 may determine whether a door of the vehicle 3 is opened and closed. In this case, the vehicle signal data D1 includes a signal indicating opening/closing of the door. The vehicle situation determining unit 310 determines whether the door of the vehicle 3 is opened and closed on the basis of the signal.

In order to determine whether the seating state has changed, the vehicle situation determining unit 310 may determine both of whether the seating sensor for a seat has changed and whether the door of the vehicle 3 is opened and closed.

As described above, in Step S30, the vehicle situation determining unit 310 can determine whether the predetermined time has not elapsed after ignition-on has been performed or whether the seating state has changed. Accordingly, the detection function control unit 311 activates the face authentication function when the vehicle situation determining unit 310 determines that the changes of all of the acceleration of the vehicle 3, the position of the vehicle 3, and the speed of the vehicle 3 are less than the predetermined values and the vehicle situation determining unit 310 determines that the predetermined time has not elapsed after ignition-on has been performed or the vehicle situation determining unit 310 determines that the seating state has changed.

FIG. 5 is a diagram illustrating an example of the detection function control process according to the embodiment.

Step S110: The vehicle situation determining unit 310 acquires various results of detection. Here, the vehicle situation determining unit 310 acquires the sound data E1 from the sound data acquiring unit 207.

Step S120: The vehicle situation determining unit 310 determines whether the driver 2 is speaking. The vehicle situation determining unit 310 determines whether the driver 2 is speaking or silent on the basis of the speech of the driver 2 indicated by the sound data E1.

When the vehicle situation determining unit 310 determines that the driver 2 is speaking (Step S120: YES), the detection function managing unit 31 performs the process of Step S130. On the other hand, when the vehicle situation determining unit 310 determines that the driver 2 is not speaking (silent) (Step S120: NO), the detection function managing unit 31 performs the process of Step S140.

Step S130: The detection function control unit 311 determines that the image recognition function of determining a calling motion is to be activated. The detection function control unit 311 causes the calling motion determining unit 303 to perform the image recognition function of determining a calling motion. Accordingly, when the vehicle situation determining unit 310 determines that the driver 2 is speaking, the detection function control unit 311 activates the image recognition function of determining a calling motion.

Step S140: The detection function control unit 311 determines that the image recognition function of determining drowsy driving is to be activated. The detection function control unit 311 causes the drowsy driving determining unit 302 to perform the image recognition function of determining drowsy driving. Accordingly, when the vehicle situation determining unit 310 determines that the driver 2 is silent, the detection function control unit 311 activates the image recognition function of determining drowsy driving.

Then, the detection function managing unit 31 ends the detection function control process.

In the detection function control process illustrated in FIG. 5, an example in which whether the image recognition function of determining drowsy driving is to be activated is determined depending on whether the driver 2 is speaking has been described above, but the present invention is not limited thereto. For example, whether the image recognition function of determining drowsy driving is to be activated may be determined on the basis of speech of the driver 2 and the steering angle. In this case, when the driver 2 is silent and the steering angle is equal to or greater than a predetermined value, it is determined that there is a likelihood of drowsy driving, and the detection function control unit 311 activates the function.

As described above, the detection function control device according to the embodiment (the drive recorder 1 in the embodiment) includes the vehicle situation determining unit 310 and the detection function control unit 311.

The vehicle situation determining unit 310 determines a situation of the vehicle 3 (the vehicle situation in the embodiment) on the basis of the results of detection of one or more of the ignition state, whether a driver is seated in a seat, the acceleration of the vehicle 3, the position of the vehicle 3, the speed of the vehicle 3, and the collected sound.

The detection function control unit 311 determines which of one or more detection functions for detecting dangerous driving (the face authenticating unit 300, the inattentive driving determining unit 301, the drowsy driving determining unit 302, and the calling motion determining unit 303 in the embodiment) is to be activated on the basis of the situation (the vehicle situation in the embodiment) determined by the vehicle situation determining unit 310.

In the detection function control device according to the embodiment (the drive recorder 1 in the embodiment) with this configuration, since only a necessary function based on the situation of the vehicle 3 out of one or more detection functions for detecting dangerous driving can be activated, it is possible to activate more detection functions for the computation capability thereof. As described above, the detection functions are based on AI. In the detection function control device according to the embodiment, it is possible to mount and execute more dangerous driving warning functions in a DMS provided in a small-sized terminal with less computation capability.

In the detection function control device according to the embodiment (the drive recorder 1 in the embodiment), the detection function control unit 311 activates the face authentication function (the face authenticating unit 300 in the embodiment) when the vehicle situation determining unit 310 determines that the changes of all of the acceleration of the vehicle 3, the position of the vehicle 3, and the speed of the vehicle 3 are less the predetermined values and the vehicle situation determining unit 310 determines that the predetermined time has not elapsed after ignition-on has been performed or the vehicle situation determining unit 310 determines that the seating state has changed, and activates the function of determining inattentive driving (the inattentive driving determining unit 301 in the embodiment) when the vehicle situation determining unit 310 determines that the changes of one or more of the acceleration of the vehicle 3, the position of the vehicle 3, and the speed of the vehicle 3 are equal to or greater than the predetermined values.

In the detection function control device according to the embodiment (the drive recorder 1 in the embodiment) with this configuration, since whether exchange of the driver 2 has occurred can be determined on the basis of a result of determination indicating that the vehicle 3 is not moving, it is possible to activate the face authentication function when exchange of the driver 2 occurs. In the detection function control device according to the embodiment, since it can be determined whether the vehicle 3 is traveling, it is possible to activate the function of determining inattentive driving when the vehicle 3 is traveling.

The condition used for the detection function control device to activate the face authentication function or the function of determining inattentive driving is not limited to the aforementioned conditions. For example, when the vehicle situation determining unit 310 determines that the changes of one or more of the acceleration of the vehicle 3, the position of the vehicle 3, and the speed of the vehicle 3 are less than the predetermined values and the vehicle situation determining unit 310 determines that the predetermined time has not elapsed after ignition-on has been performed, the detection function control unit 311 may activate the face authenticating unit 300. When the vehicle situation determining unit 310 determines that the changes of all of the acceleration of the vehicle 3, the position of the vehicle 3, and the speed of the vehicle 3 are equal to or greater than the predetermined values, the detection function control unit 311 may activate the inattentive driving determining unit 301.

When the vehicle situation determining unit 310 determines that the changes of one or more of the acceleration of the vehicle 3, the position of the vehicle 3, and the speed of the vehicle 3 are less than the predetermined values, the detection function control unit 311 may activate the face authenticating unit 300. When the vehicle situation determining unit 310 determines that the predetermined time has not elapsed after ignition-on has been performed, the detection function control unit 311 may activate the face authenticating unit 300.

In the detection function control device according to the embodiment (the drive recorder 1 in the embodiment), the detection function control unit 311 activates the image recognition function of determining a calling motion (the calling motion determining unit 303 in the embodiment) when the vehicle situation determining unit 310 determines that the driver 2 is speaking, and activates the image recognition function of determining drowsy driving (the drowsy driving determining unit 302 in the embodiment) when the vehicle situation determining unit 310 determines that the driver 2 is silent.

In the detection function control device according to the embodiment (the drive recorder 1 in the embodiment) with this configuration, since it can be determined whether the driver 2 is speaking, it is possible to activate the image recognition function of determining drowsy driving when the driver 2 is silent.

One or more of the face authenticating unit 300, the inattentive driving determining unit 301, the drowsy driving determining unit 302, and the calling motion determining unit 303 may be omitted from the configuration of the detection executing unit 30. A functional unit having another detection function may be provided in the configuration of the detection executing unit 30 in addition to the face authenticating unit 300, the inattentive driving determining unit 301, the drowsy driving determining unit 302, and the calling motion determining unit 303 or instead of one thereof.

The vehicle situation determining unit 310 may handle discrimination of day and night as the vehicle situation. It is thought that detection of drowsy driving is not necessary in the daytime. In this case, the drive recorder 1 may include an illuminance sensor. When the vehicle situation determining unit 310 determines that brightness measured by the illuminance sensor is equal to or greater than a predetermined value, the detection function control unit 311 does not cause the drowsy driving determining unit 302 to activate the image recognition function of determining drowsy driving.

The drive recorder 1 has a recording function of storing an image which is normally recorded by the camera 14 in the storage unit 212 in addition to the functions described above with reference to FIG. 2.

The drive recorder 1 may perform an impact-detected process. The impact-detected process includes a process of causing the sound output unit 29 to output warning sound and a process of causing the display unit 210 to display a warning screen when an impact equal to or greater than a predetermined magnitude has been detected. The impact-detected process includes a process of generating event information and storing the event information in the storage unit 212.

The control unit 20 may be provided as a function of a device which is mounted in the vehicle 3 other than the drive recorder. When the device is a small-sized terminal, the configuration of the control unit 20 can be suitably used. Here, the small-sized terminal means a terminal of which the computation capability is not high and which is less likely to enable a plurality of AI functions to function simultaneously.

A part of the drive recorder 1, for example, the control unit 20, according to the embodiment may be realized by a computer. In this case, the control unit may be realized by recording a program for realizing the control function on a computer-readable recording medium and causing a computer system to read and execute the program recorded on the recording medium. The "computer system" mentioned herein is a computer system built in the drive recorder 1 and includes an OS or hardware such as peripherals. The "computer-readable recording medium" is a portable medium such as a flexible disk, a magneto-optical disc, a ROM, or a CD-ROM or a storage device such as a hard disk built in the computer system. The "computer-readable recording medium" may include a medium that dynamically holds a program for a short time like a communication line when the program is transmitted via a network such as the Internet or a communication line such as a telephone line and a medium that holds a program for a predetermined time like a volatile memory in a computer system serving as a server or a client in that case. The program may be for realizing some of the aforementioned functions or may be for realizing the aforementioned functions in combination with a program stored in advance in the computer system.

A part or whole parts of the drive recorder 1 according to the embodiment may be realized as an integrated circuit such as a large-scale integration (LSI). The functional blocks of the drive recorder 1 may be individually provided as processors or some or all thereof may be integrated as a processor. The technique of circuit integration is not limited to LSI, but the integrated circuit may be realized as a dedicated circuit or a general-purpose processor. When a technique of circuit integration taking place of LSI appears with advancement in semiconductor technology, an integrated circuit based on the technique may be used.

While an embodiment of the present invention has been described above in detail with reference to the drawings, the specific configuration thereof is not limited to the above description, and various modifications in design or the like can be performed without departing from the gist of the present invention.

INDUSTRIAL APPLICABILITY

The detection function control device according to the embodiment can be mounted as a drive recorder on a vehicle for use.

What is claimed is:

1. A detection function control device comprising:
   a processor coupled to a memory storing instructions for the processor to function as:
      a vehicle situation determining unit configured to determine a situation of a vehicle on a basis of detection results of one or more of an ignition state, whether a driver is seated in a seat, an acceleration of the vehicle, a position of the vehicle, a speed of the vehicle, and sound which is collected; and
      a detection function control unit configured to determine which of one or more detection functions for detecting dangerous driving is to be activated on the basis of the situation determined by the vehicle situation determining unit,
   wherein the detection function control unit activates a face authentication function when the vehicle situation determining unit determines that changes of all of the acceleration, the position, and the speed are less than predetermined values and the vehicle situation determining unit determines that a predetermined time has not elapsed after ignition-on has been performed or the vehicle situation determining unit determines that a seating state has changed.

2. The detection function control device according to claim 1, wherein the detection function control unit activates a function of determining inattentive driving when the vehicle situation determining unit determines that changes of one or more of the acceleration, the position, and the speed are equal to or greater than predetermined values.

3. The detection function control device according to claim 1, wherein the detection function control unit activates an image recognition function of determining calling motion when the vehicle situation determining unit determines that a driver is speaking.

4. The detection function control device according to claim 1, wherein the detection function control unit activates an image recognition function of determining drowsy driving when the vehicle situation determining unit determines that a driver is silent.

5. A detection function control method comprising:
   a vehicle situation determining a situation of a vehicle on a basis of detection results of one or more of an ignition state, whether a driver is seated in a seat, an acceleration of the vehicle, a position of the vehicle, a speed of the vehicle, and sound which is collected; and
   a detection function determining which of one or more detection functions for detecting dangerous driving is to be activated on the basis of the situation determined in the vehicle situation determining,
   wherein the detection function determining includes activating a face authentication function when determines that changes of all of the acceleration, the position, and the speed are less than predetermined values and determines that a predetermined time has not elapsed after ignition-on has been performed or determines that a seating state has changed.

6. A non-transitory computer readable medium storing a program causing a computer to execute:
   a vehicle situation determining a situation of a vehicle on a basis of detection results of one or more of an ignition state, whether a driver is seated in a seat, an acceleration of the vehicle, a position of the vehicle, a speed of the vehicle, and sound which is collected; and
   a detection function determining which of one or more detection functions for detecting dangerous driving is to be activated on the basis of the situation determined in the vehicle situation determining,
   wherein the detection function determining includes activating a face authentication function when determines that changes of all of the acceleration, the position, and the speed are less than predetermined values and determines that a predetermined time has not elapsed after ignition-on has been performed or determines that a seating state has changed.

* * * * *